Inventor
Richard D. Miller
By H R Rather
Attorney

United States Patent Office 3,146,330
Patented Aug. 25, 1964

3,146,330
TOGGLE SWITCH LEVER MOUNTING
Richard G. Miller, Cudahy, Wis., assignor to Cutler-Hammer, Inc., Milwaukee, Wis., a corporation of Delaware
Filed Sept. 17, 1962, Ser. No. 224,086
5 Claims. (Cl. 200—172)

This invention relates to toggle lever operated electric switches and more particularly to the mounting of toggle levers in switch assemblies.

In the construction of electric switches it is common to pivotally mount toggle lever operators with a ball and socket joint, the ball being formed intermediately upon the lever operator and the socket being provided on the interior of a cylindrical bushing attached to the body of the switch. Heretofore, such bushings were commonly constructed of metal and the sockets formed after insertion of the lever ball by staking or upsetting material from the bushing wall or by insertion of additional members, such as a ring inside the bushing to form a support or retainer for the lever ball. Elimination of such additional parts and forming operations would produce benefits such as simplicity and uniformity of structure and would contribute to the economical production of such switches.

It is therefore an object of this invention to provide a ball and socket mounting for a lever operator in which the lever ball can be assembled to a switch structure by simple insertion into a socket joint without subsequent forming operations or insertion of additional supporting or retaining members.

It is a specific object of this invention to provide a socket of resilient construction into which a toggle lever ball may be pressed to accomplish assembly of a toggle lever operator to an electric switch structure.

It is a further specific object of this invention to provide such a ball and socket joint in which the socket is formed as an integral portion of a resilient bushing or sleeve attached to the body of an electric switch.

Other objects and advantages of this invention will be evident to those skilled in the art upon reference to the following description and claims.

While the device hereinafter described is adapted to fulfill the objects stated, it is to be understood that it is not intended that the invention be confined to the particular preferred embodiment disclosed since it is susceptible of various modifications without departing from the scope of the appended claims.

Figure 1:
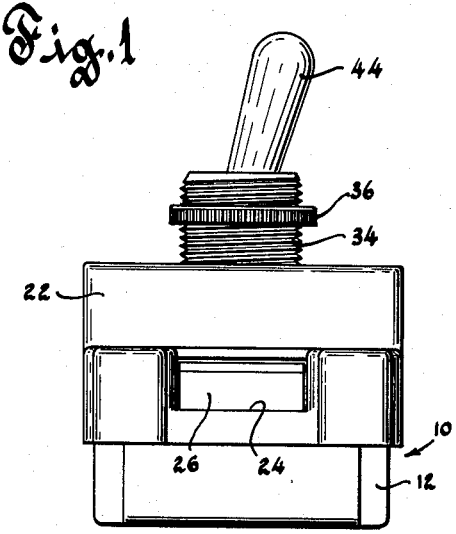
FIGURE 1 is a front elevation view of the exterior of a toggle operated electric switch embodying the invention.
Figure 2:
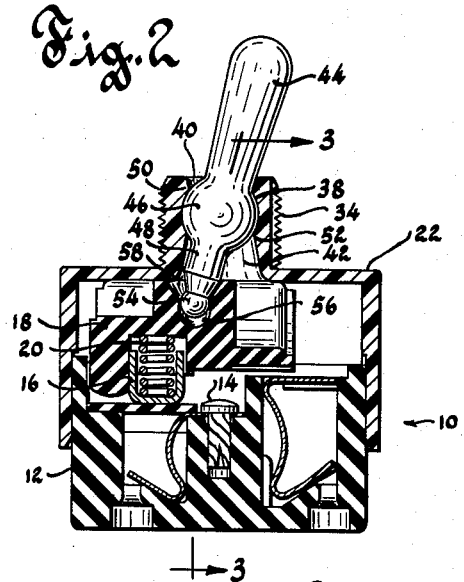
FIG. 2 is a sectional view taken on line 2—2 of FIG. 3.
Figure 3:
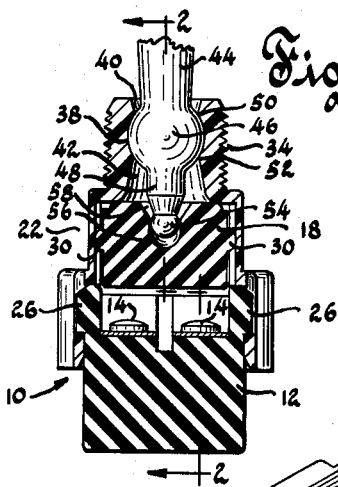
FIG. 3 is a sectional view taken on line 3—3 of FIG. 2.
Figure 4:
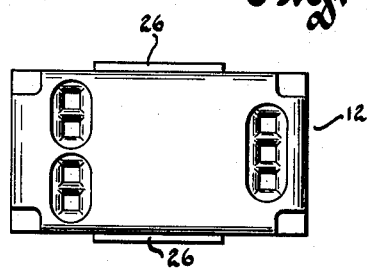
FIG. 4 is a bottom view of the base portion of the switch.
Figure 5:
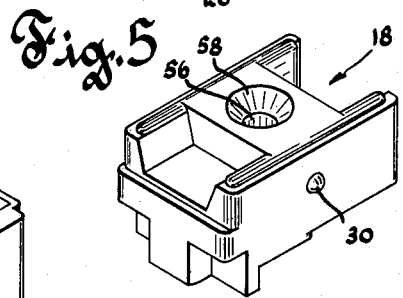
FIG. 5 is an isometric view showing details of a disassembled portion of the switch.
Figure 6:
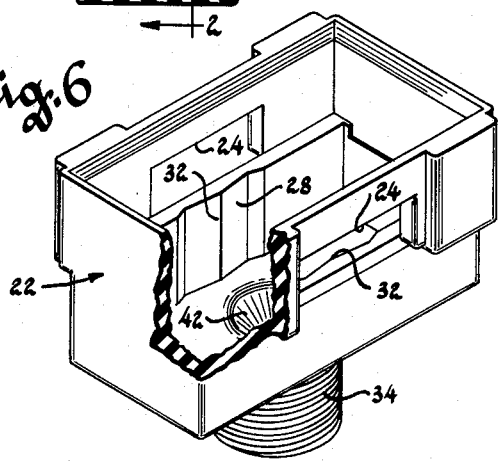
FIG. 6 is an isometric view showing details of another disassembled and inverted portion of the switch.

Referring to the drawings, the switch housing 10 includes a base 12, the construction of which is more completely described in Patent No. 2,942,087, issued to G. J. Meuer, dated June 21, 1960, for a trigger type switch employing a similar base member. Two stationary contacts 14 are mounted in base 12, and a movable bridging contact 16 is retained by and vertically slidable within a recess in the lower face of a horizontally reciprocable contact carrier 18. A compression spring 20 biases movable contact 16 downwardly to insure sufficient contact pressure. A cover 22 made of resilient plastic material has rectangular apertures 24 which snap over projections 26 on base 12 to complete the switch housing 10.

The switch is made snap-acting by providing cam surfaces 28 on the interior of opposite elastic walls of the plastic cover 22 upon which projections 30 on the sides of carrier 18 ride. Each cam surface 28 has a peaked center 32 and is integrally molded into the flexible cover wall so that when the carrier 18 is reciprocated the projections 30 ride up on the center peak 32 of the cams which flexes the cover cam carrying walls outwardly. As projections 30 ride over the peaked cam, the outwardly flexed cover walls return to their normal position with a snap thereby snapping the carrier to either "on" or "off" position. This provides a relatively quick make or break of the circuit and gives a proper "feel" to the switch.

A cylindrical mounting bushing 34 extends from the top surface of cover 22 and is molded integrally therewith. The outer surface of bushing 34 is threaded to engage mounting nut 36 (FIG. 1). Extending vertically through bushing 34 there is an aperturer having a central spherical socket surface 38 and upper and lower frusto-conical surfaces 40 and 42. A toggle lever operator 44 having a central ball pivot 46 and a lower extension 48 passes through bushing 34 and pivots therein. The intersection of spherical surface 38 with conical surfaces 40 and 42 define upper and lower circumferential ridges 50 and 52 in the interior aperture of bushing 34 thereby forming a socket which pivotally accommodates ball 46.

The rounded end 54 of lower extension 48 fits loosely into a depression 56 in the bottom of a frusto-conical recess 58 formed in the top surface of carrier 18. As toggle lever 44 is moved, the lower end 54 of lever 44 transmits the operating force to the sides of depression 56 imparting horizontally reciprocatory movement to carrier 18 to move bridging contact 16 between its "on" and "off" positions.

The assembly of the switch is facilitated by the design of the toggle lever 44 and the socket 38 within bushing 34. While it is possible to insert lever 44 into bushing 34 from either the top or the bottom, assembly is preferably accomplished from the bottom and lower ridge 52 may be of greater diameter than upper ridge 50 to facilitate the insertion of ball 46. As ball 46 is pressed into bushing 34, the walls of conical surface 42 being resilient, are forced outwardly. When ball 46 passes the constriction formed by ridge 52, the walls of bushing 34 elastically return to their original positions and ball 46 is retained within the socket formed by spherical surface 38. It can be seen that neither of the ridges 50 and 52 need be continuous circumferential ridges but the openings of the socket might be constricted by intermittent ridges or a series of projections on the interior of bushing 34.

I claim:

1. An electric switch having a housing enclosing the contacts and an actuator extending from the outside into the housing for closing and opening the contacts, means mounting said actuator for pivotal movement comprising an enlarged portion intermediate the ends of said actuator, a bushing formed of elastic material in a wall of the housing and having an aperture through which said actuator extends, a pair of spaced constrictions in said aperture forming a socket therebetween for retaining said enlarged portion of said actuator for pivotal movement, and one of said constrictions being smaller than the largest dimension of said enlarged portion associated therewith by an amount affording deformation within the elastic limits of said elastic material sufficient to allow said enlarged portion to be forced past said one constriction into said socket and to be securely retained therein upon elastic restoration of said one constriction to its former shape.

2. The invention as defined in claim 1, in which said one constriction is formed within said aperture nearer the exterior of said housing than the other of said constrictions whereby said enlarged portion may be inserted into said socket from the exterior of said housing.

3. An electric switch comprising a housing, a cylindrical bushing of resilient plastic extending from said housing and having an aperture extending therethrough to the interior of said housing, a stationary contact and a movable contact within said housing, an operating lever for moving said movable contact into and out of contact making engagement with said stationary contact, said operating lever extending through said bushing to the interior of said housing and being pivotally mounted in said aperture, and means pivotally mounting said lever in said aperture comprising a spherical enlarged portion of said lever intermediate the ends of said lever and a socket having first and second constricted openings formed within said aperture on the interior of said bushing, a continuous circular ridge formed about the inner surface of said bushing for constricting said first opening, said enlarged portion being of larger size than the normal size of either of said openings but insertable through the first of said openings by elastic enlargement of said first opening to thereby engage the interior of said socket and being pivotally retained therein.

4. An electric switch comprising a housing, a bushing of resilient plastic material extending from said housing and having an aperture extending therethrough to the interior of said housing, a stationary contact and a movable contact within said housing, an operating lever for moving said movable contact into and out of contact making engagement with said stationary contact, said operating lever extending through said bushing to the interior of said housing and being pivotally mounted in said aperture, and means pivotally mounting said lever in said aperture comprising a ball-shaped enlarged portion of said lever intermediate the ends of said lever and a socket having constricted openings formed within said aperture on the interior of said bushing, the first of said constricted openings of said socket being nearest the interior of said housing and being of greater size than the second of said openings, said enlarged portion being of larger size than the normal size of either of said openings but insertable through the said first opening by elastic enlargement of said first opening to thereby engage the interior of said socket and be pivotally retained therein.

5. The invention as defined in claim 4, together with a frusto-conical surface formed on the interior of said bushing between said first constricted opening and the interior of said housing, the smaller diameter of said frusto-conical surface being toward said first constricted opening to aid insertion of said enlarged portion past said first opening.

References Cited in the file of this patent
UNITED STATES PATENTS
3,047,682     Hults _____ July 31, 1962